(12) United States Patent
Wu

(10) Patent No.: US 7,349,387 B2
(45) Date of Patent: Mar. 25, 2008

(54) DIGITAL CROSS-CONNECT

(76) Inventor: Ephrem C. Wu, 1161 Vernon Ter., San Mateo, CA (US) 94402

( * ) Notice: Subject to any disclaimer, the term of this patent is extended or adjusted under 35 U.S.C. 154(b) by 1101 days.

(21) Appl. No.: 10/341,546

(22) Filed: Jan. 13, 2003

(65) Prior Publication Data

US 2004/0062228 A1    Apr. 1, 2004

Related U.S. Application Data

(60) Provisional application No. 60/414,699, filed on Sep. 27, 2002.

(51) Int. Cl.
    *H04L 12/50* (2006.01)
(52) U.S. Cl. .................... 370/360; 370/463
(58) Field of Classification Search .......... 370/360, 370/463, 373
    See application file for complete search history.

(56) References Cited

U.S. PATENT DOCUMENTS

| | | | |
|---|---|---|---|
| 3,735,049 A | 5/1973 | Buchner et al. | |
| 3,736,381 A | 5/1973 | Johnson et al. | |
| 3,925,621 A | 12/1975 | Collins et al. | |
| 3,927,267 A | 12/1975 | Voyer et al. | |
| 3,956,593 A | 5/1976 | Collins et al. | |
| 4,005,272 A | 1/1977 | Collins et al. | |
| 4,038,497 A * | 7/1977 | Collins et al. | 370/361 |
| 4,797,589 A | 1/1989 | Collins | |
| 4,817,083 A * | 3/1989 | Richards | 370/369 |
| 4,855,999 A * | 8/1989 | Chao | 370/538 |
| 4,967,405 A | 10/1990 | Upp et al. | |
| 5,040,170 A * | 8/1991 | Upp et al. | 398/50 |
| 5,130,975 A * | 7/1992 | Akata | 370/416 |
| 5,923,653 A * | 7/1999 | Denton | 370/375 |
| 5,945,922 A | 8/1999 | Gao et al. | |
| 6,169,737 B1 | 1/2001 | Lindberg et al. | |
| 6,215,773 B1 | 4/2001 | Karlsson | |
| 6,240,063 B1 * | 5/2001 | Suzuki | 370/217 |
| 6,584,121 B1 * | 6/2003 | Garg et al. | 370/474 |
| 6,628,609 B2 * | 9/2003 | Chapman et al. | 370/229 |
| 6,870,838 B2 * | 3/2005 | Dally | 370/369 |

(Continued)

FOREIGN PATENT DOCUMENTS

WO    WO 96/08902    3/1996

OTHER PUBLICATIONS

Hwang, F. K., and Liaw, S.-C., "On Nonblocking Multicast Three-Stage Clos Networks," *IEEE/ACM Transactions on Networking*, 8(4): 535-539 (2000).

(Continued)

*Primary Examiner*—Kwang Bin Yao
*Assistant Examiner*—Sameer Aghera
(74) *Attorney, Agent, or Firm*—Christopher P. Maiorana P.C

(57) ABSTRACT

Two or more cross-connect ICs are interconnected. Each IC directly receives some, but not all, of the system inputs, and outputs to some, but not all, outputs. Each cross-connect IC has a switch matrix that has the same number of inputs as the system, and a lesser number of outputs that matches the number of outputs of the IC. Each cross-connect IC provides fanout of its direct inputs to a link to each other cross-connect IC. Thus, each IC receives inputs either directly, or from a fanout on another IC.

34 Claims, 19 Drawing Sheets

U.S. PATENT DOCUMENTS

| | | | |
|---|---|---|---|
| 6,944,190 B1* | 9/2005 | Tomar et al. | 370/535 |
| 7,058,010 B2* | 6/2006 | Chidambaran et al. | 370/218 |
| 7,173,930 B2* | 2/2007 | Wellbaum et al. | 370/356 |
| 2001/0053160 A1 | 12/2001 | Dally | |
| 2002/0146003 A1 | 10/2002 | Kam et al. | |

OTHER PUBLICATIONS

Beneš, V.E., "Rearrangeable Networks." In *Mathematical Theory of Connecting Networks and Telephonic Traffic*, pp. 82-135.

Clos, C., "A Study of Non-Blocking Switching Networks," *The Bell System Technical Journal*, 406-424 (1953).

Hui, J., "Multi-Point and Generalized Circuit Switching." In *Switching and Traffic Theory for Integrated Broadband Networks*, pp. 85-107.

"3.2 Gbps Cross Point Switches with Integrated Clock and Data Recovery," *VC3003 & VC3002*, Velio Communications, Inc., pp. 1-2 (May 21, 2001).

"72×72, 2.5Gb/s (STS-48/STS-48c/STM-16) with OC-192 Support SONET/SDH Grooming Switch," *VC2002*, Velio Communications, Inc., pp. 1-2 (Mar. 15, 2001).

"SONET Telecommunications Standard Primer." Tektronix, pp. 1-34 [as found on www.tektronix.com] (2001).

"SDH Telecommunications Standard Primer." Tektronix, pp. 1-38 [as found on www.tektronix.com] (2001).

Sezaki, K., et al, "The Cascade Clos Broadcast Switching Network-A New ATM Switching Network Which is Multiconnection Non-Blocking", *Proceedings of the International Switching Symposium* (ISS 1990); vol. 4, May 28, 1990-Jun. 1, 1990, pp. 143-147, XP000130910.

Ghaffar, A., et al., "Middle Stage Requirements and Blocking Probability Validation for Three Stage Broadcasting Clos Networks", *International Conference on Communications* (ICC 1996); vol. 2, Jun. 23-27, 1996, pp. 1050-1054, XP 000625932.

To, P., et al., "Generalized Non-blocking Copy Networks", International *Conference on Communications* (ICC 1997), Jun. 8-12, 1997, pp. 467-471, XP010227061.

* cited by examiner

ID
DIGITAL CROSS-CONNECT

RELATED APPLICATION

This application claims the benefit of U.S. Provisional Application No. 60/414,699, filed Sep. 27, 2002. The entire teachings of the above application are incorporated herein by reference.

BACKGROUND OF THE INVENTION

Terminology and Bandwidth Accounting

FIG. 1 is a schematic diagram of an illustrative digital cross-connect switching system that includes sixteen 10 Gbps line cards 1A, a working switch card 1D, and a protection switch card 1E connected through a high-speed backplane 1C in one shelf 1F. The line cards 1A provide the primary inputs and outputs of the digital cross-connect switching system.

Each switch card 1E, 1F contains a 160 Gbps cross connect IC. The cross-connect IC on the working switch card 1D is illustrated as object 1B. If, in this example, all line cards 1A are the same, and each supports M/16 inputs and M/16 outputs for some number M, then the cross-connect IC 1B comprises an M×M switch matrix, as shown.

The protection switch card 1E and the working switch card 1D are identical. The traffic across the backplane is 640 Gbps since the line cards send and receive 160 Gbps of data to and from each of the two switch cards.

FIG. 2 is a three-dimensional view of the 160 Gbps switching system in FIG. 1. Not all line cards must be identical in the system. For example, there could be seven 20 Gbps line cards and eight 2.5 Gbps line cards in the system to utilize the full 160 Gbps switching capacity while taking fifteen out of sixteen line card slots 2A.

Suppose that the backplane 2C is designed to accommodate 1,280 Gbps of traffic. Each switch card in the expanded system can then cross-connect at most 320 Gbps of traffic. Several options are available to achieve this bandwidth.

1) FIG. 3A illustrates a monolithic cross-connect switch 300 having N inputs and N outputs, where N=KM for some value K. For example, the monolithic 160 Gbps cross-connect IC in each switch card 2D, 2E of FIG. 2 could be replaced with a monolithic 320 Gbps cross-connect IC, where K=2.

However, since the number of crosspoints increases quadratically as a function of bandwidth, such an IC is costly to manufacture. The industry is typically not willing to pay four times the price to get twice the bandwidth. The manufacturing cost of such a monolithic IC is particularly high if advances in IC fabrication technology lag bandwidth growth.

2) Parallel processing techniques, such as bit- or byte-slicing to scale the bandwidth, could be employed. For example, two nibble-sliced 160 Gbps cross-connect ICs can switch 320 Gbps data in parallel. See, for example, McKeown, N., et al., "The Tiny Tera: A Packet Switch Core", *Hot Interconnects V*, Stanford University, August 1996, incorporated herein by reference.

FIG. 3B is a schematic diagram illustrating this technique. One cross-connect IC 55 processes the upper nibble of each byte while the other cross-connect IC 57 processes the lower nibble. This method additionally requires a slicer 51 to slice, and a reassembler 53 to reassemble, data between the line cards and the switch cards. If line cards perform slicing and reassembly, then only these line cards can communicate with the sliced cross-connects.

Legacy line cards that do not slice and reassemble data would have to be modified or replaced, an option that does not offer backward compatibility. A cross-connect bandwidth upgrade should involve upgrading the switch cards while preserving the line cards to be cost-effective.

If the switch card performs slicing and reassembly, then additional ICs are necessary to slice and reassemble the data there. Since all data links are high-speed links (typically at 2.5 Gbps line rate in 2002), this option doubles the number of these high-speed links on the switch card and triples the number of high-speed ports since the number of high-speed ports in the slicer and the reassembler is twice as many as that of the cross-connect ICs. As a result, this approach doubles the amount of high-speed link routing on the switch card and triples the power consumed by the high-speed ports.

3) A 320 Gbps cross-connect with multiple smaller cross-connect ICs could be implemented to form a Clos network but the resulting system is blocking for arbitrary multicast traffic and requires scheduling. See Clos, C., "A Study of Non-Blocking Switching Networks," *Bell System Technical Journal*, vol. 32, 406-424, 1953, incorporated herein by reference.

SUMMARY OF THE INVENTION

The present invention addresses three concerns for digital cross-connect system bandwidth upgrade with integrated circuits (ICs): 1) scalability with minimal additional cross-connect IC cost; 2) backward compatibility with existing line cards; and 3) non-blocking switching for arbitrary multicast.

The present invention requires only K identical cross-connect ICs for each switch card to scale K times the bandwidth of the original digital cross-connect system, and maintains non-blocking switching for arbitrary multicast traffic without requiring line card changes or additional ICs on the switch card to preprocess the data. Depending on the IC technology, K such cross-connect ICs are more economical to manufacture than a monolithic cross-connect IC with K times the bandwidth.

A switching system or method, according to an embodiment of the present invention, includes two or more cross-connect ICs. Each IC directly receives some, but not all, of the system inputs, and outputs to some, but not all, outputs. Each cross-connect IC has a switch matrix that has the same number of inputs as the system, and a lesser number of outputs that matches the number of outputs of the IC. Each cross-connect IC provides fanout of its direct inputs to a link to each other cross-connect IC. Thus, each IC receives inputs either directly, or from a fanout on another IC.

Each cross-connect IC may further include deskewers that deskew or synchronize, after fanout, data streams which are input to the cross-connect's switch matrix, such that all data streams entering the switch matrix are synchronized. The deskewers may be, for example, but are not limited to, first-in-first-out (FIFO) buffers.

Plural input streams may be merged into a merged stream prior to being forwarded to other cross-connect ICs. The merged stream preferably has a higher bandwidth than the individual input streams contained therein, and may be formed by bit-interleaving the input streams.

Unique identifiers may be embedded into unused portions, e.g., overhead bytes, of one or more of the input streams. A cross-connect IC receiving a merged stream can then demultiplex and reconstruct the input streams based on identifiers embedded in the input streams.

Data streams may be, but are not limited to SONET or SDH data streams.

Different inputs/outputs may have different bandwidth capabilities.

Another embodiment of the invention is a cross-connect integrated circuit (IC), which includes input ports for directly receiving less than all of the inputs to the switching system, as well as output ports for outputting to less than all outputs of the switching system. One or more link receivers for receive, over one or more links connected to additional (second) cross-connect ICs, inputs which are directly received by those cross-connect ICs. A switch matrix on the IC has an input for each system input, and a lesser number of outputs matching the outputs of the IC, i.e., the direct outputs. A fanout circuit provides fanout of the directly received inputs, for transmission over the link(s) to the second cross-connect ICs.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 12A-1, 12A-2, 12B-1, and 12B-2 are schematic diagrams illustrating how two rectangular cross-connect ICs may be connected together, in an embodiment of the present invention, to groom 320Gbps STS-1 data in a non-blocking fashion.

DETAILED DESCRIPTION OF THE INVENTION

A description of preferred embodiments of the invention follows.

System Overview

An embodiment of the present invention requires K cross-connect ICs to scale the switching system bandwidth K times.

Figure 4A:
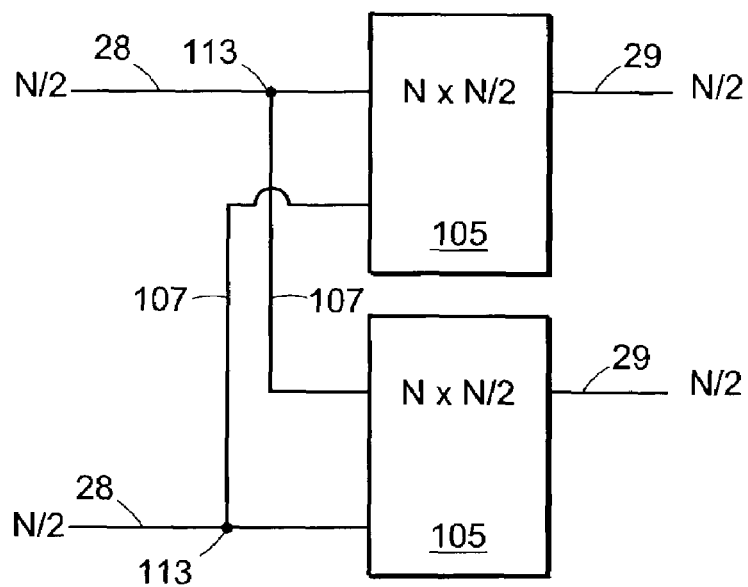
FIG. 4A is a schematic diagram illustrating an embodiment of the present invention, where bandwidth has been doubled relative to the system shown in FIG. 1, i.e., K=2.

FIG. 4A is a schematic diagram illustrating an embodiment of the present invention, where bandwidth has been doubled, i.e., K=2, so that there are now N inputs and N outputs, where N=2×M. Each half (N/2) of the inputs 28 is routed directly to a corresponding rectangular N×N/2 (or equivalently, 2M×M) switch matrices 105. In addition, fanout circuitry 113, described below, distributes the direct inputs over links 107 to each other switch matrix 105. Thus, each switch matrix 105 receives all N inputs (N/2 directly and N/2 from the other switch matrix's fanout), while only connecting half (N/2) of the inputs to the N/2 directly connected outputs 29.

Figure 4B:
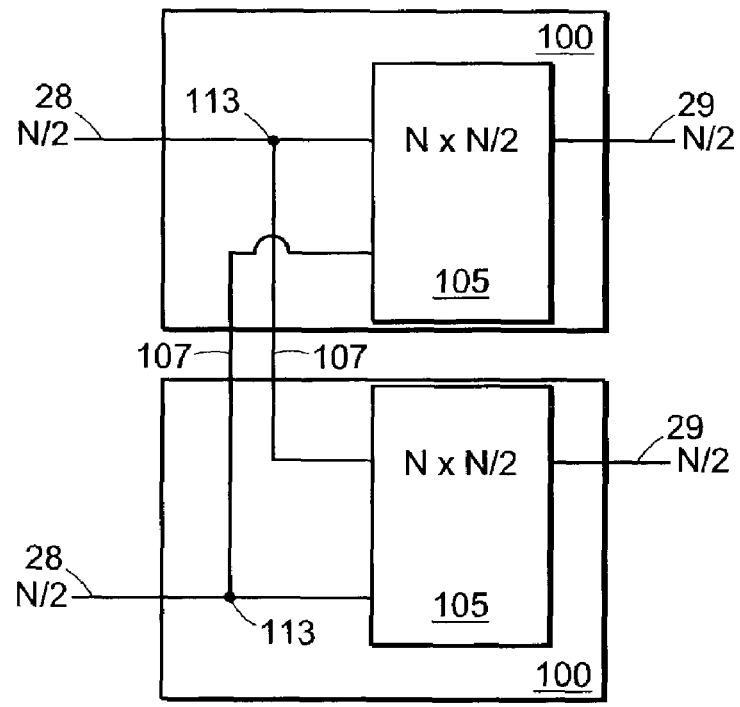
FIG. 4B is a schematic diagram illustrating an embodiment of the present invention similar to that shown in FIG. 4A, but where the fanout circuitry is co-located with a switch matrix in a cross-connect integrated circuit.

FIG. 4B is a schematic diagram illustrating an embodiment of the present invention similar to that shown in FIG. 4A, but where the fanout circuitry 113 is co-located with a switch matrix 105 in a cross-connect integrated circuit (IC) 100. By locating the fanouts 113 on the respective cross-connect ICs 100, the amount of extra circuitry needed on the switch card (FIG. 1, 1D) is greatly reduced, and implementation simplified. As described below, implementation may be further simplified (i.e., IC pin count and printed circuit board trace count) by multiplexing plural input streams and serializing the multiplexed data for transmission over the links 107.

Thus, without the internal fanout of the cross-connect, a system would have to have an external fanout device, since any fanout signal must go through deserialization. (Differential high-speed signals cannot be fanned out, because they are all point-to-point connections). The number of high-speed transmitters and receivers of such an "external fanout" system would thus be higher than that required by the present invention. The present invention is therefore more power-, cost- and space-efficient than a system with external fanout.

Figure 4C:
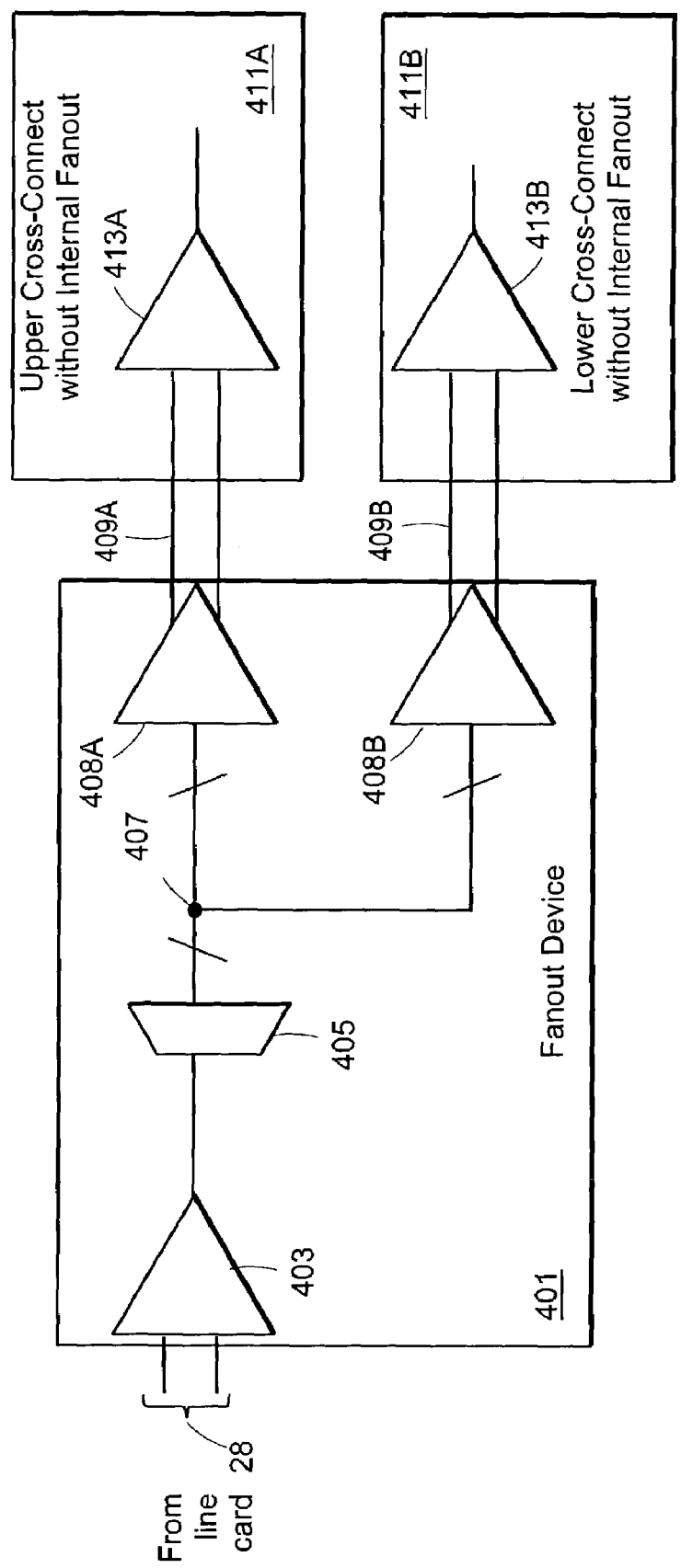
FIGS. 4C and 4D are block diagrams that demonstrate the advantages of the internal fanout of the present invention.
Figure 4D:
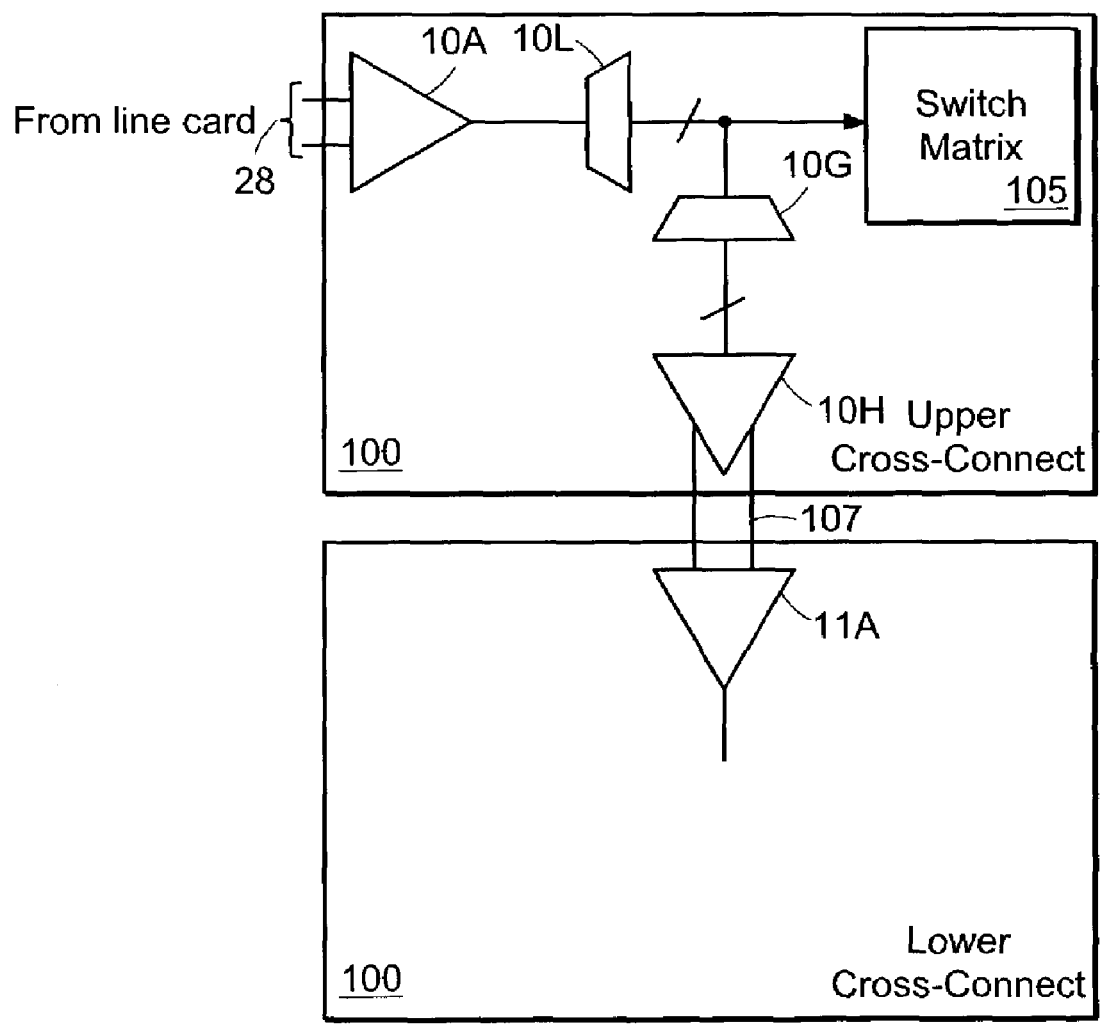

FIGS. 4C and 4D demonstrate the advantages of the internal fanout more clearly.

FIG. 4C is a block diagram illustrating a system with external fanouts. Three high-speed receivers 403, 413A, 413B and two high-speed transmitters 408A, 408B are necessary to distribute the same signal 28 from the line card to two cross-connects 411A, 411B that have no internal fanout. In addition, three differential pairs of high-speed board traces are required on the board: one 28 from the line card to the high-speed receiver 403, one 409A from the high-speed transmitter 408A to the high-speed receiver 413A, and one 409B from the high-speed transmitter 408B to the high-speed receiver 413B.

FIG. 4D, on the other hand, is a block diagram illustrating an embodiment of the present invention having internal fanout. Here, only two high-speed receivers 10A, 11A and one high-speed transmitter 10H are required to distribute the high-speed differential signal 28 from the line card to both cross-connect ICs 100. Furthermore, only two differential pairs are needed to route the above differential signal: one 28 from the line card to the high-speed receiver 10A and the other 107 from the high-speed transmitter 10H to the high-speed receiver 11A. The internal fanout system of FIG. 4D thus requires fewer high-speed board traces than the external fanout system of FIG. 4C.

Figure 1:
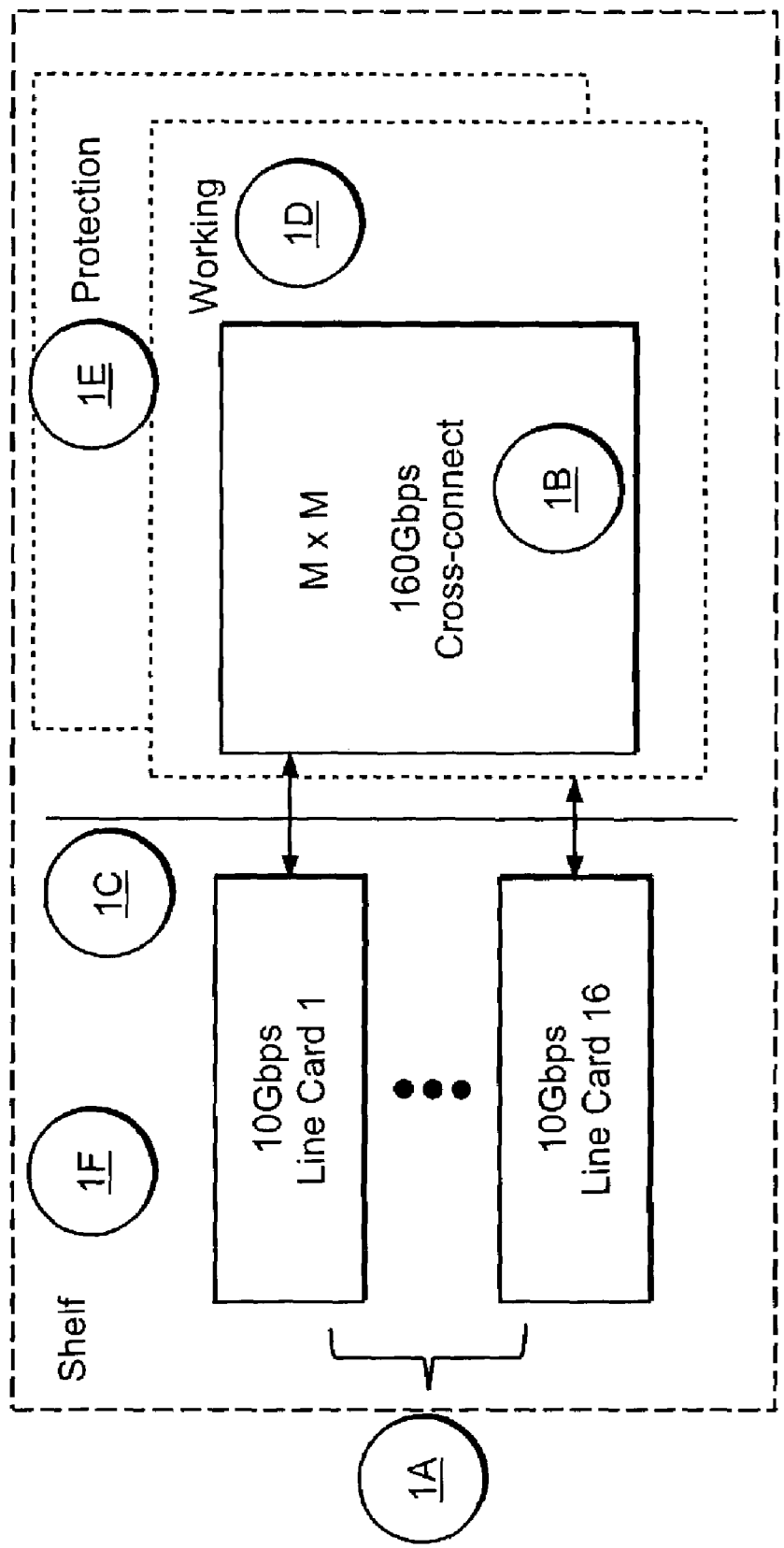
FIG. 1 is a schematic diagram of a typical digital cross-connect switching system.
Figure 4E:
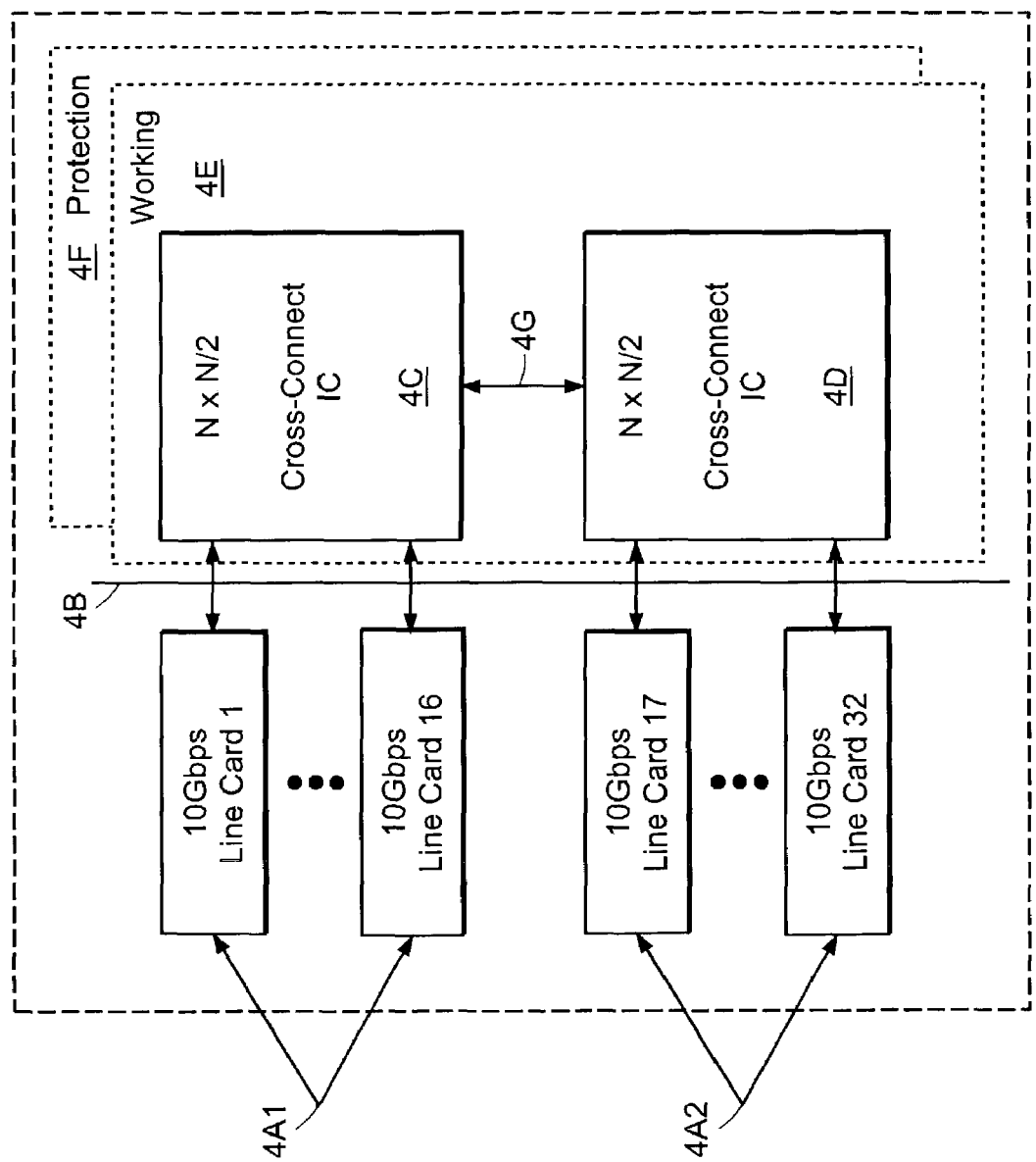
FIG. 4E is a schematic diagram illustrating the system of FIG. 1 upgraded to 320 Gbps using an embodiment of the present invention.

FIG. 4E is a schematic diagram illustrating the system of FIG. 1 upgraded to 320 Gbps using an embodiment of the present invention. Line cards 4A1, 4A2 are the primary inputs and outputs of the system. In this example, the aggregate bandwidth of the line cards is 320 Gbps for the inputs and the outputs. For clarity, not all line cards are shown. Line cards 4A1 represent 160 Gbps of the system aggregate bandwidth, while line cards 4A2 represent the other 160 Gbps. The backplane 4B carries 1.28 Tbps of traffic: 320 Gbps to and 320 Gbps from the working switch card 4E and 320 Gbps to and 320 Gbps from the protection switch card 4F.

The protection switch card 4F is identical to the working switch card 4E. The two cross-connect ICs 4C, 4D shown on the working switch card 4E are identical and together switch 320 Gbps of traffic to and from the line cards 4A. Bidirectional inter-IC links 4G, 160 Gbps in each direction, accomplish non-blocking switching for arbitrary multicast. As a result, each cross-connect IC 4C/4D has 320 Gbps of inputs and 320 Gbps of outputs, half of which are connected to half of the line cards while the other half are connected to the other cross-connect IC.

Figure 5:
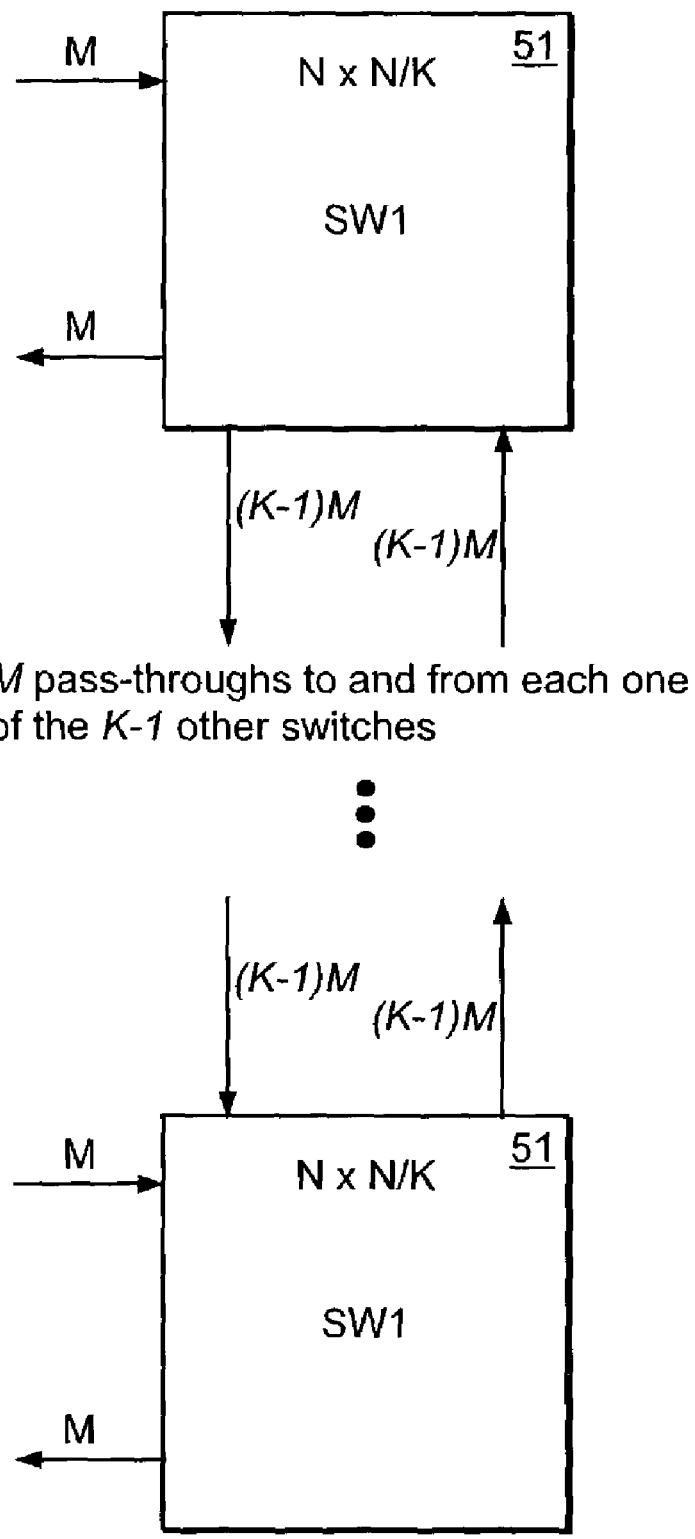
FIG. 5 is a schematic diagram that, generally, illustrates K cross-connect ICs in an embodiment of the present invention.

FIG. 5 is a schematic diagram that, generally, illustrates K cross-connect ICs 51. Each IC 51 has 1/K of the KM inputs and outputs connected directly to the line cards and 1/K of the KM inputs and outputs connected to each one of the other identical K−1 ICs 51. The cross-connect ICs can thus scale the system bandwidth K times.

Figure 6:
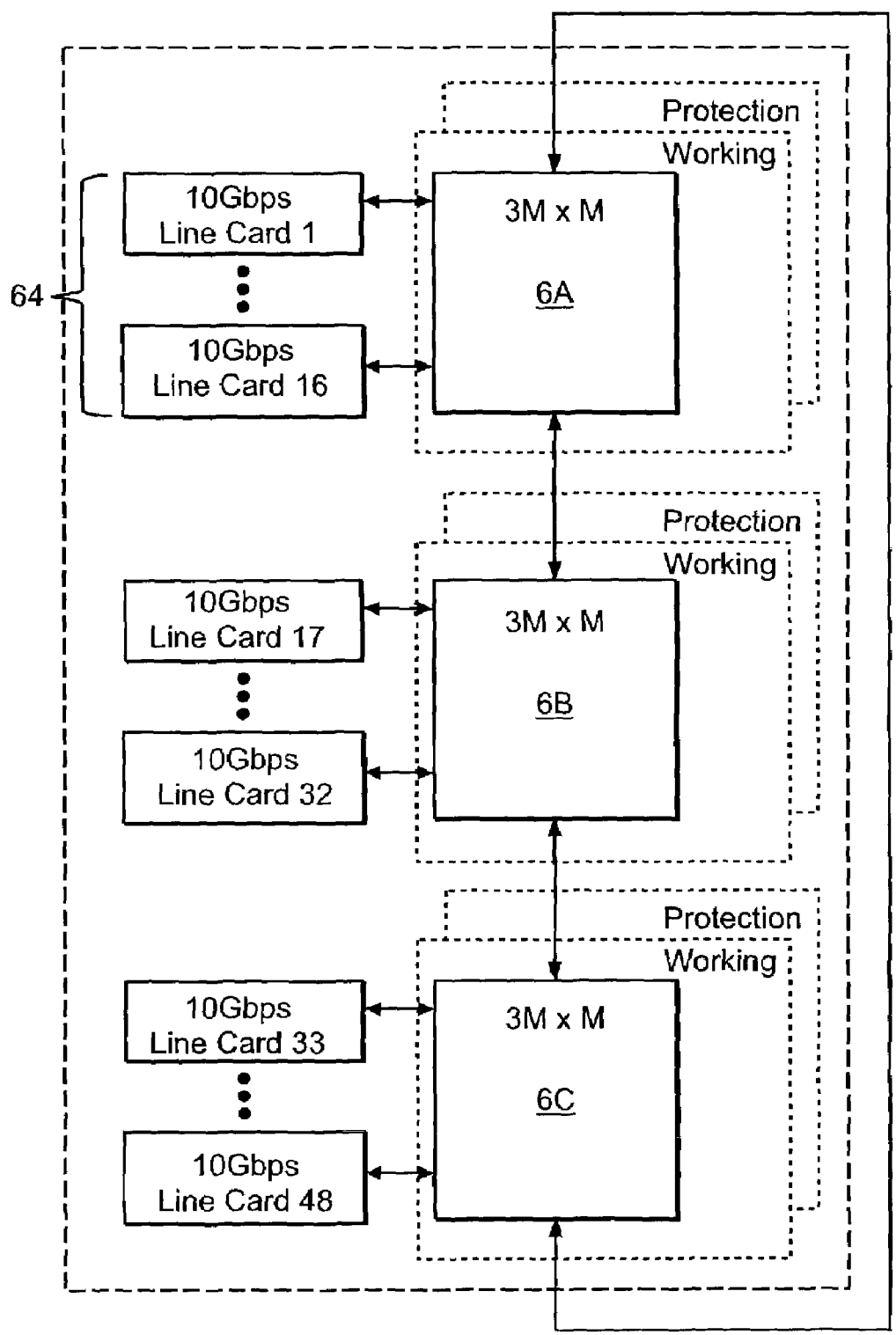
FIG. 6 is a schematic diagram illustrating an embodiment of the present invention with K=3.

FIG. 6 is a schematic diagram illustrating an embodiment of the present invention with K=3. The cross-connect ICs 6A-6C are identical. Without loss of generality, the following description focuses on cross-connect IC 6A, which has 160 Gbps of inputs and 160 Gbps of outputs connected to line cards 64 and 160 Gbps of inputs and 160 Gbps of outputs connected to each one of the other two cross-connect ICs 6B, 6C. The cross-connect 6A thus has 480 Gbps and 480 Gbps of inputs and outputs.

Port Partitioning

Figure 7:
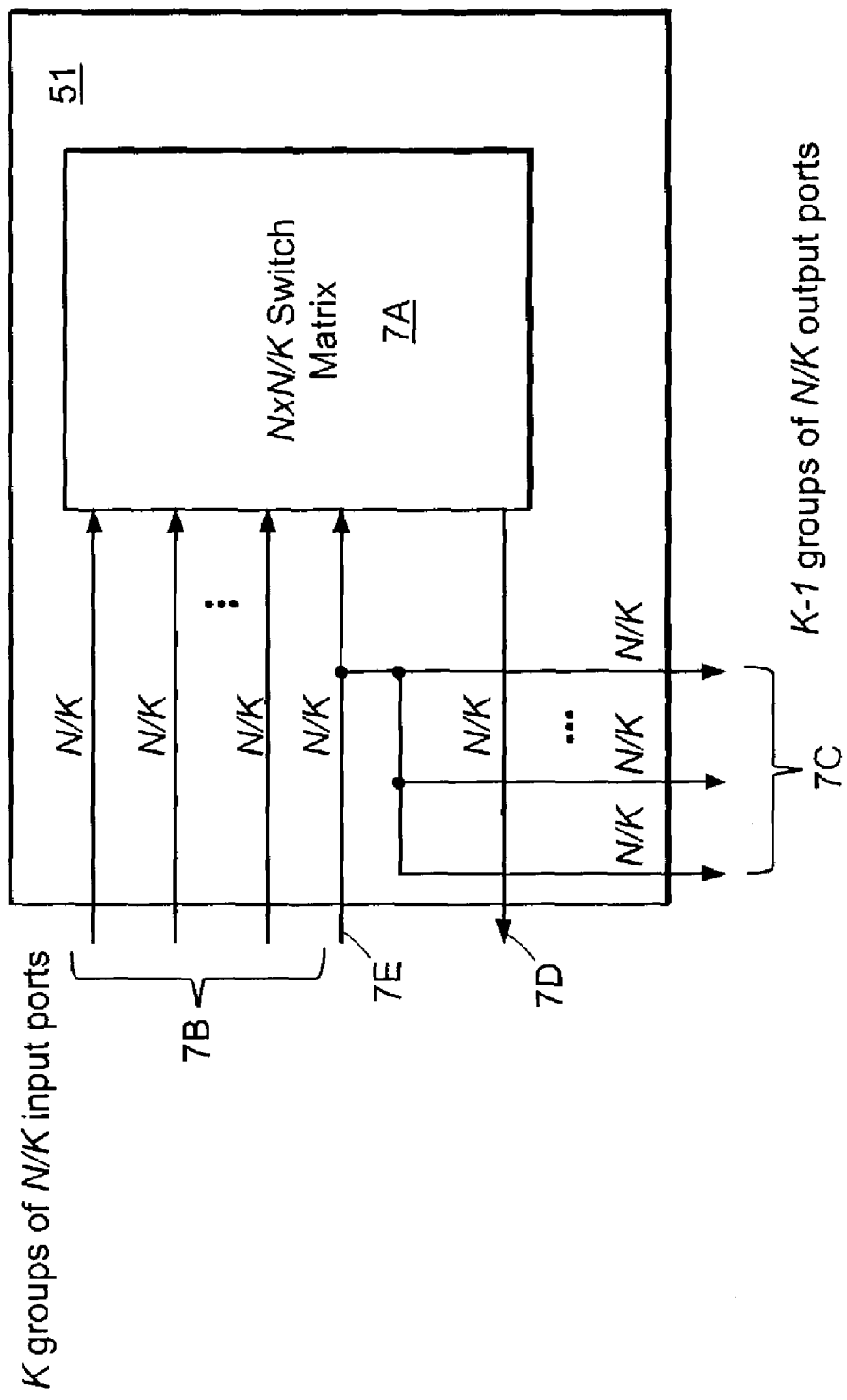
FIG. 7 is a schematic diagram illustrating one of the ICs of FIG. 5.

FIG. 7 is a schematic diagram illustrating one of the ICs 51 of FIG. 5. Instead of using an N×N switch matrix in one square cross-connect IC, where N=KM (see FIG. 5), an embodiment of the present invention uses K rectangular cross-connect ICs, each having an $$N \times \frac{N}{K}$$

switch matrix 7A. These rectangular cross-connect ICs, in combination, perform the same function as a monolithic N×N cross-connect IC.

Each rectangular cross-connect IC has (K−1) sets of $$\frac{N}{K}$$

pass-through ports 7C. Each set of pass-through ports is connected to a particular one of the other K−1 rectangular cross-connect ICs. In particular, each set of the $$\frac{N}{K}$$

pass-through output ports 7C gets its inputs from a unique set of $$\frac{N}{K}$$

input ports 7E that are directly connected to a set of line cards, without the data going through the switch matrix 7A. The other K−1 sets of input ports 7B are received from other ICs via pass-through input ports. Only one set of $$\frac{N}{K}$$

output ports 7D is directly connected to the switch matrix 7A.

Those skilled in the art should see, depending on N, that K being 2, for instance, the present invention can reduce the die size from that required for an N×N square cross-connect IC so that two such rectangular cross-connect ICs are less costly to manufacture than a monolithic N×N square cross-connect IC.

PASS-THROUGH PATH CONSTRUCTION

This section discusses how the pass-through paths may be constructed to eliminate external devices to compensate for cross-connect latency. A SONET/SDH cross-connect is assumed, but the description applies to any cross-connect with a synchronous switch matrix. Each input port in a SONET/SDH cross-connect contains a deskew FIFO to absorb clock transients and arrival time mismatch due to differences in path lengths. The pass-through output ports get their data from before the deskew FIFO input; otherwise, additional deskew devices, for instance, SONET/SDH pointer adjusters, would be necessary in the switching system.

Deskew FIFO Overview

A SONET/SDH cross-connect deskew FIFO typically has its write clock in the recovered clock domain for its particular input port. The read clocks of all such FIFOs are derived from the same source so that the data streams going into the switch matrix are synchronous and properly aligned. In particular, the switch matrix accepts the first byte of each frame (start-of-frame) from each input at the same time. Typically, a cross-connect IC has a reference frame pulse and a programmable counter so that reading of the start-offrame begins some time after the active edge of the reference frame pulse, as specified by the programmable counter. Adjusting the programmable counter changes the latency of the cross-connect IC.

Cross-Connect Circular Latency Dependency

Figure 8:
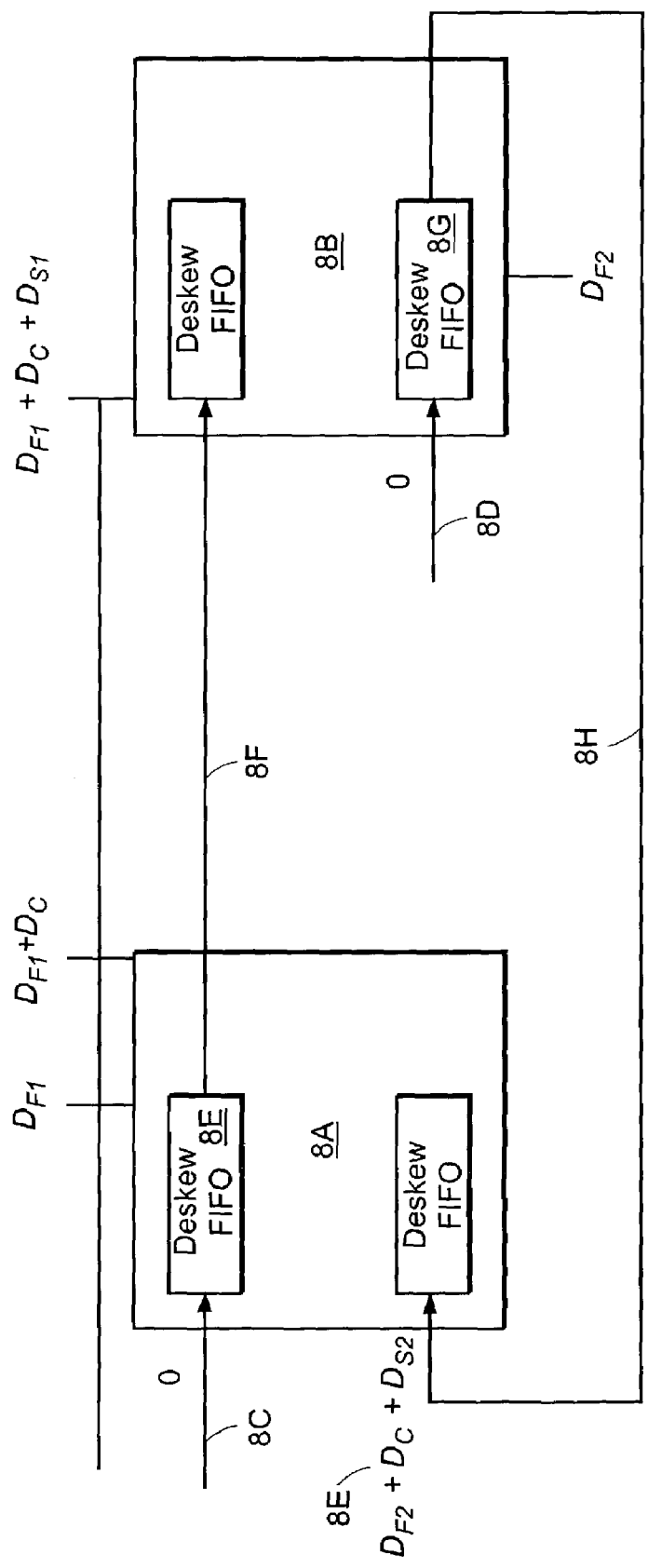
FIG. 8 is a schematic diagram illustrating circular dependency latency that may occur when two SONET cross-connect ICs are connected via links.

FIG. 8 is a schematic diagram illustrating two SONET cross-connect ICs 8A, 8B connected via links 8F and 8H. Consider the path through input port 8C, cross-connect 8A, and link 8F. Without loss of generality, suppose that the start-of-frame arrival time at input port 8C of cross-connect 8A is 0. Suppose also that the reference frame pulse programmable counter in switch 8A is set such that the at time $D_{F1}$, the start-of-frame appears at the output of the deskew FIFO 8E. Let the latency from the output of any FIFO to any pass-through output be $D_C$ and the delay through the link 8F be $D_{S1}$. Then the start-of-frame arrival time at the input connected to link 8F in cross-connect 8B is $D_{F1}+D_C+D_{S1}$.

Now consider the path through input port 8D, cross-connect 8B, and link 8H. Again, without loss of generality, suppose that the start-of-frame arrival time at 8D is 0 and that the programmable counter in 8B is set such that the start-of-frame appears at the output of the deskew FIFO 8G at time $D_{F2}$. Let the delay through the link 8H be $D_{S2}$. Then the start-of-frame arrival time at the input port of 8A connected to the link 8H is $D_{F2}+D_C+D_{S2}$.

Note that because the FIFOs cannot overflow if they are to deskew the data properly, $D_{F1}+D_C+D_{S1}$ must be less than $D_{F2}$, and $D_{F2}+D_C+D_{S2}$ must be less than $D_{F1}$. Obviously, these conditions cannot both be true.

Figure 9:
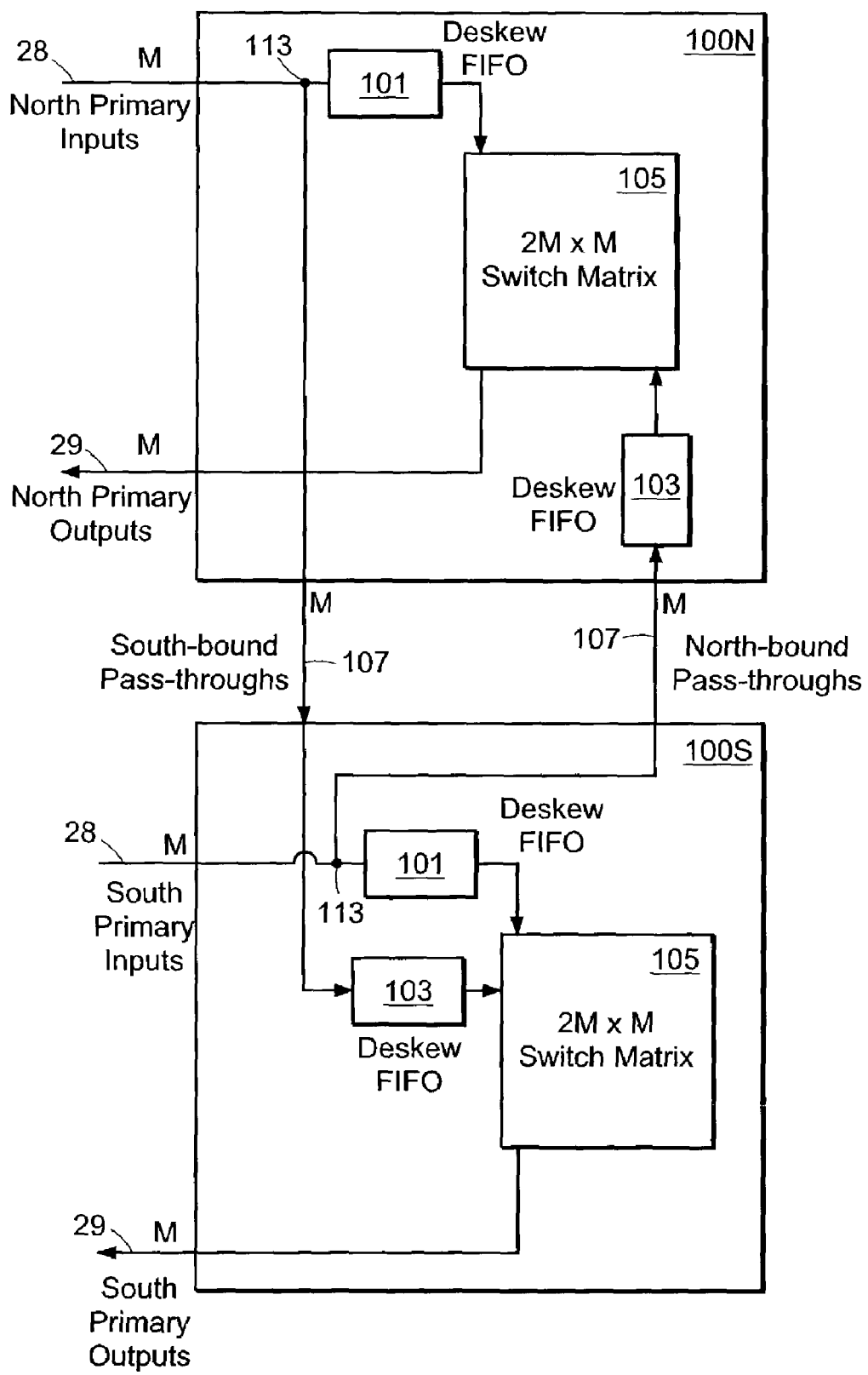
FIG. 9 is a schematic diagram illustrating how circular latency dependency can be avoided by an embodiment of the present invention.

FIG. 9 is a schematic diagram illustrating how the circular latency dependency shown in FIG. 8 is avoided by an embodiment of the present invention. In this two-IC illustrative example, inter-cross-connect links 107 from each IC 100 are connected to input ports of the other IC without first being deskewed by deskewing FIFOs 101. Instead, deskewing FIFOs 103 on each IC deskew the inputs passed by the other IC. Thus, all inputs to a switch matrix 105 are deskewed on the same IC as the switch matrix 105.

Reducing Pin Count for Pass-Through Ports

The primary inputs and outputs preferably run at line rates compatible with the line cards. The pass-through ports, on the other hand, can run at a higher rate to reduce pin count, board traces, and, in the case of multi-shelf applications, connectors and cables.

Multiplexing Pass-Through Data

Without loss of generality, consider the merging of two 2.5 Gbps input streams into one 5 Gbps stream, transmitted through a pass-through output port. Since the two input streams are taken from before the deskew FIFO, the 5 Gbps output stream needs to be retimed. The deskewing/synchronizing FIFOs can be such that the write clock of each FIFO originates in each of the recovered clock domains. The read clock can be in one of the recovered clock domains or can be driven by an external mesochronous reference clock.

Figure 10A:
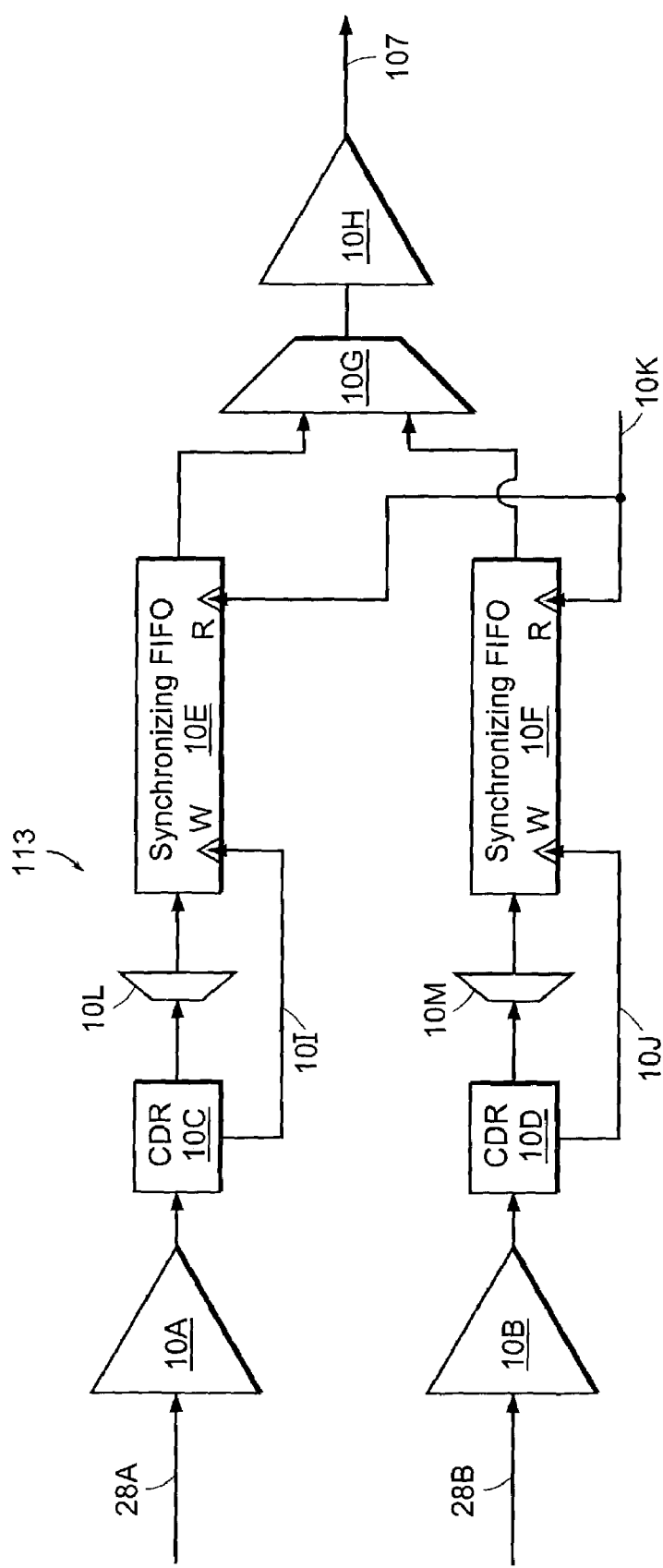
FIGS. 10A and 10B are schematic diagrams illustrating the fanout circuitry of FIG. 9, and the merging of two data structures into a single merged stream in an embodiment of the present invention.

FIG. 10A is a schematic diagram illustrating the fanout circuitry 113 of FIG. 9 and the merging of two input streams into a single merged stream. The first 2.5 Gbps stream is processed by receiver 10A, clock-data recovery (CDR) unit 10C, and deserializer 10L, finally feeding the input of the synchronizing FIFO 10E whose write clock is the recovered clock 10I of this stream. Similarly the second 2.5 Gbps stream is processed by receiver 10B, CDR 10D, and deserializer 10M, feeding the input of the synchronizing FIFO 10F whose write clock is the recovered clock 10J of this stream.

The read clock 10K of both FIFOs 10E, 10F must be the same. This clock can be one of the recovered clocks, 10I, 10J, or an external mesochronous reference clock. Preferably, the read and write pointers of each FIFO are kept apart enough so that the FIFO does not overflow or underflow, and that there are enough entries in the FIFO to absorb clock transients in the 2.5 Gbps streams. The two streams from the FIFOs are then bit-interleaved and serialized in 10G before reaching the pass-through output port through the 5 Gbps transmitter 10H.

Figure 10B:
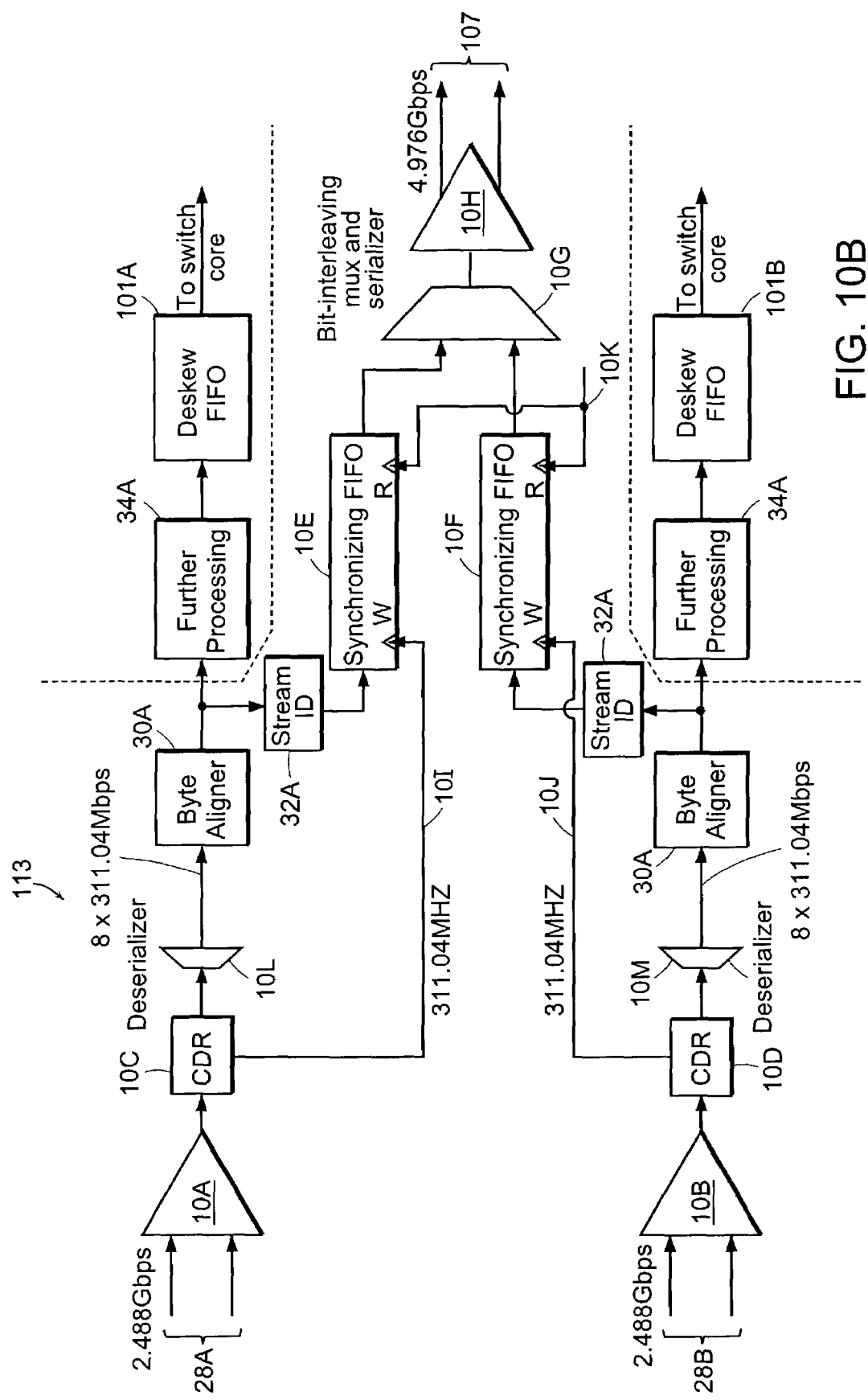

FIG. 10B is a schematic diagram providing further details to FIG. 10A. The multiplexing circuitry comprises stream-ID insert units 32 (discussed below), the synchronizing FIFO buffers 10E, 10OF and the bit-interleaving multiplexor and serializer 10G. Note that each incoming stream 28 is actually a point-to-point differential signal which cannot be readily fanned out on a circuit board. Fan-out to the pass-through port 10H occurs after byte aligners 30 and before the stream-ID insert units 32.

After fan-out, the signals may be further processed by blocks 34 and deskewed by deskew FIFOs 101 before being presented to the switch matrix resident on the particular cross-connect IC.

Demultiplexing Pass-Through Data

Once the 5 Gbps stream reaches the input port of the next cross-connect IC, that input port must have a means to retrieve the original two 2.5 Gbps streams. For SONET/SDH streams, stamping an overhead byte, such as the forty-seventh A2 byte in an STS-48/STM-16 frame, with a uniquely identifiable 2.5 Gbps stream ID can enable the downstream receiver to distinguish between the two bit-interleaved 2.5 Gbps streams. Since the A2 byte is not scrambled in SONET/SDH, the codeword chosen for the stream ID should not disturb DC balance. The forty-seventh A2 byte is used as an example here because it is typically not used for framing. This stamping may be done by the stream-ID insert units 32 (FIG. 10B).

Figure 11:
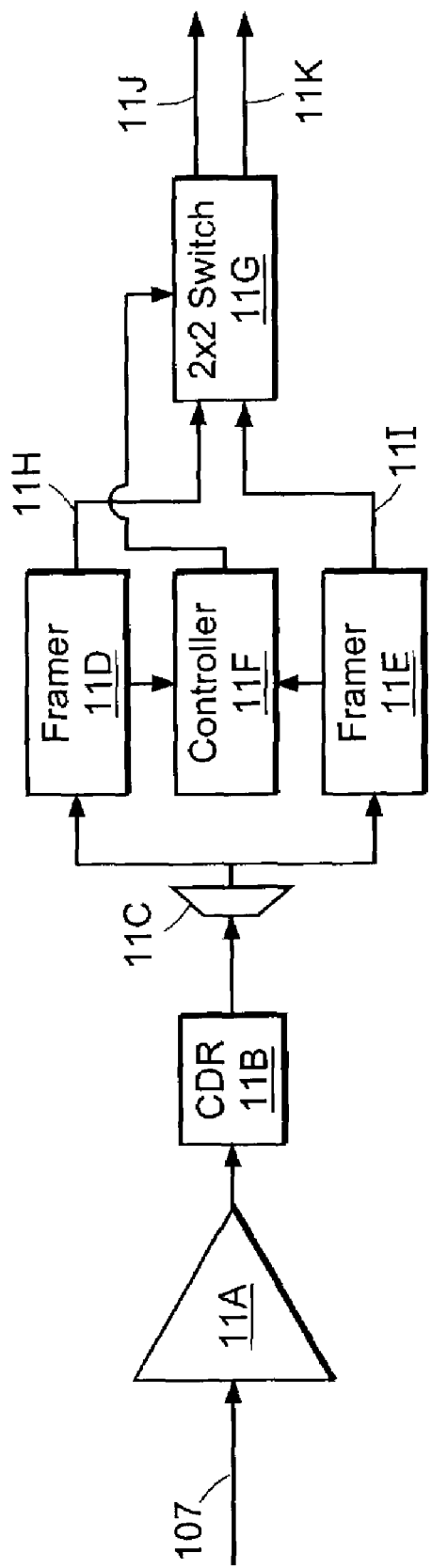
FIG. 11 is a schematic diagram illustrating a bit-interleaving receiver implementation as employed in the embodiment of FIGS. 10A and 10B.

FIG. 11 is a schematic diagram illustrating a bit-interleaving receiver implementation. The 5 Gbps receiver 11A sends its data to the CDR 11B, which feeds the deserializer 11C. The deserializer 11C arbitrarily sends every other bit to the framer 11D and the other half of the data to framer 11E. These two framers look for the A1/A2 SONET/SDH framing boundary in parallel. Once any one of the framers has determined the proper framing boundary, it can locate the stamped overhead byte with the stream ID. The framer then sends the ID to the 2×2 switch controller 11F.

Suppose that the two stream IDs are 0 and 1. Let "N/A" denote an ID not yet available to the 2×2 switch controller 11F. Then there are 9 possible states of the two inputs into 11F. Table 1 illustrates the 9 possible states. In the "Action" column, "straight through" means that the 2×2 switch 11G has input 11H connected to output 11J and input 11I connected to output 11K. "Swap" indicates that the 2×2 switch 11G has input 11H connected to output 11K and input 11I connected to output 11J.

TABLE 1

Switch Controller State Table

| Input from Framer 11D | Input from Framer 11E | Action |
| --- | --- | --- |
| 0 | 0 | Report error |
| 0 | 1 | Straight through |
| 0 | N/A | Straight through |
| 1 | 0 | Swap |

TABLE 1-continued

Switch Controller State Table

| Input from Framer 11D | Input from Framer 11E | Action |
|---|---|---|
| 1 | 1 | Report error |
| 1 | N/A | Swap |
| N/A | 0 | Swap |
| N/A | 1 | Straight through |
| N/A | N/A | Straight through |

For instance, whenever the stream IDs from the two framers are different and the ID from framer 11D is 0 or the ID from framer 11E is 1, then output 11J receives data from 11H and 11K from 11I. Likewise, whenever the IDs are different and the ID from framer 11D is 1 or the ID from framer 1E is 0, then the output 11J is connected to 11I and 11K to 11H. When both IDs are either 0 or 1, then the controller reports an error. When both IDs are "N/A", the framers are still looking for the A1/A2 boundary and the switch is in pass-through mode. Note that this implementation requires only one of the streams to be stamped and ensures that the output port 1J receives the stream stamped with ID "0" and the output port 11K receives the stream stamped with ID "1".

Connection Set-up

FIGS. 12A-1, 12A-2, 12B-1, and 12B-2 are schematic diagrams illustrating how two rectangular cross-connect ICs may be connected together to groom 320Gbps STS-1 data in a non-blocking fashion. Bold lines represent data flow for four combinations of cross-connecting inputs and outputs. Each cross-connect IC accepts 160Gbps data from the line cards and sends the data to two destinations: 1) its 320 Gbps×160 Gbps switch core after the deskew FIFO and 2) the other cross-connect IC before the deskew FIFO.

Figure 2:
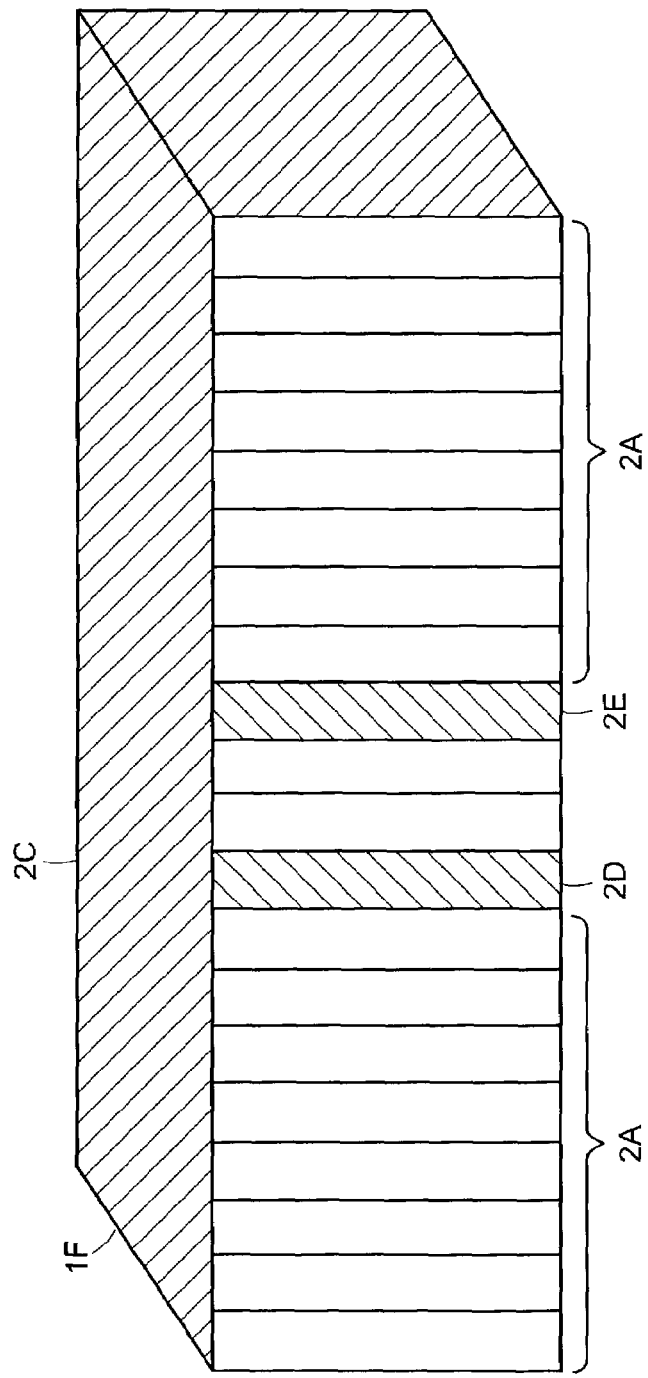
FIG. 2 is a three-dimensional view of the 160 Gbps switching system in FIG. 1.
Figure 3A:
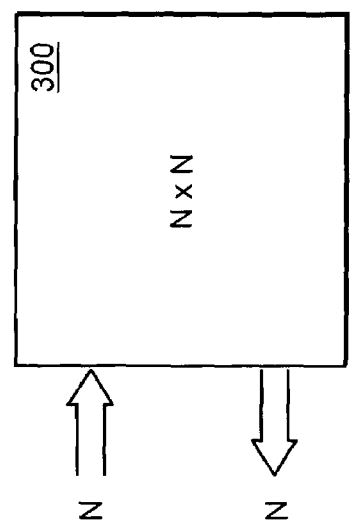
FIG. 3A is a schematic diagram illustrating a simple but expensive solution to increased bandwidth, by quadratically growing the square switch matrix to N×N, where N=K×M.
Figure 3B:
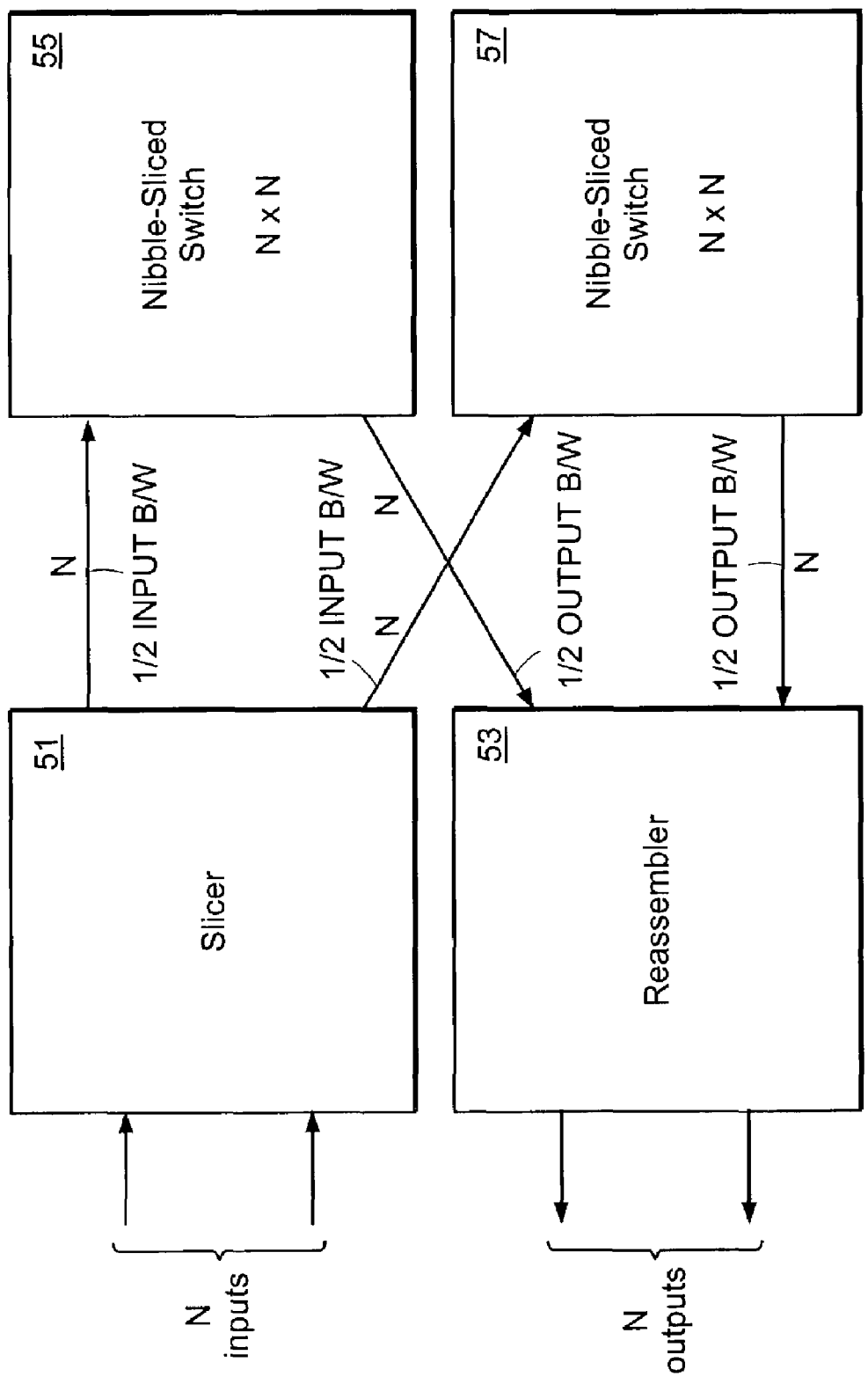
FIG. 3B is a schematic diagram illustrating a parallel processing technique.
Figures 1, 12A:
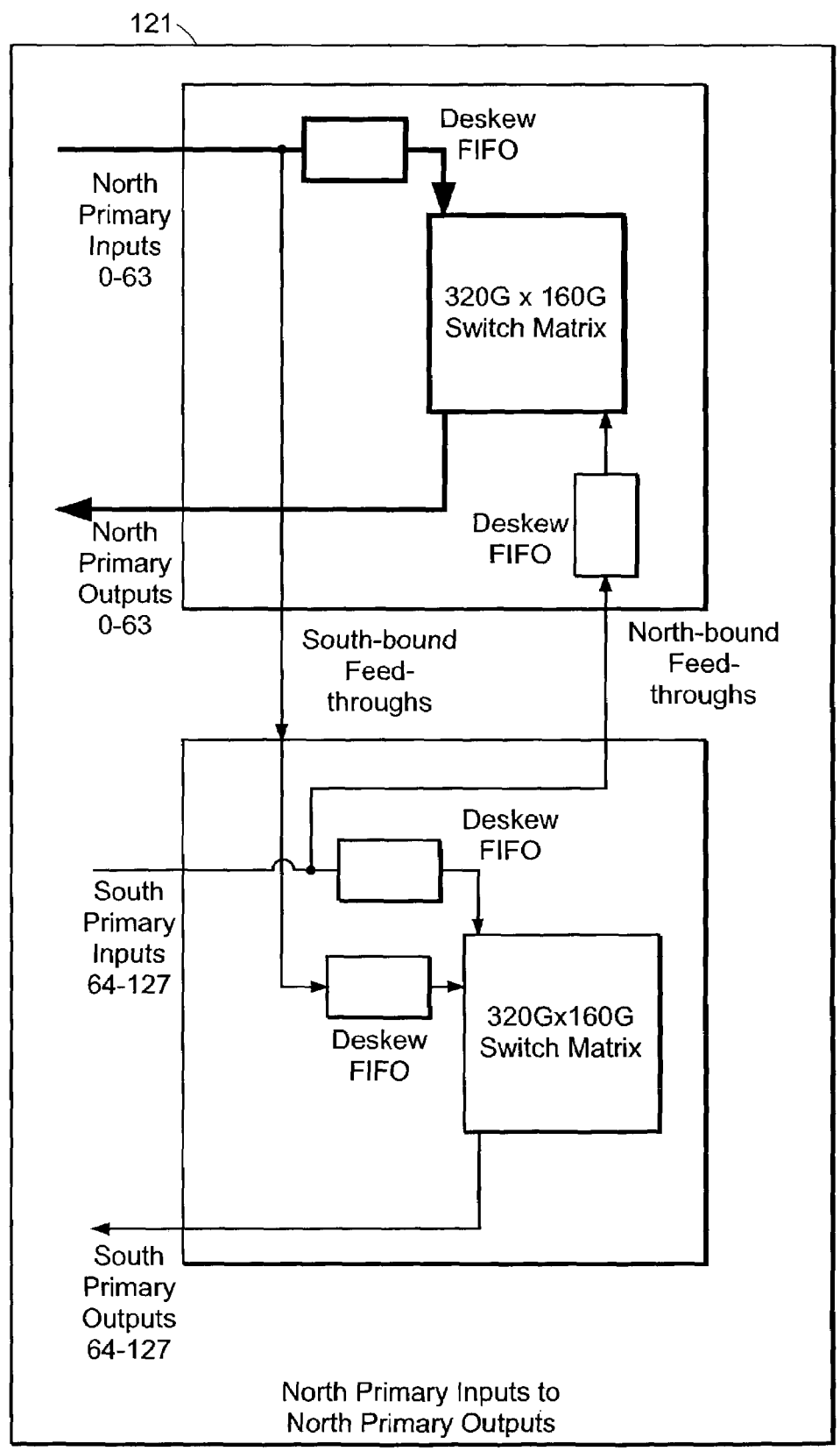
Figures 2, 12A:
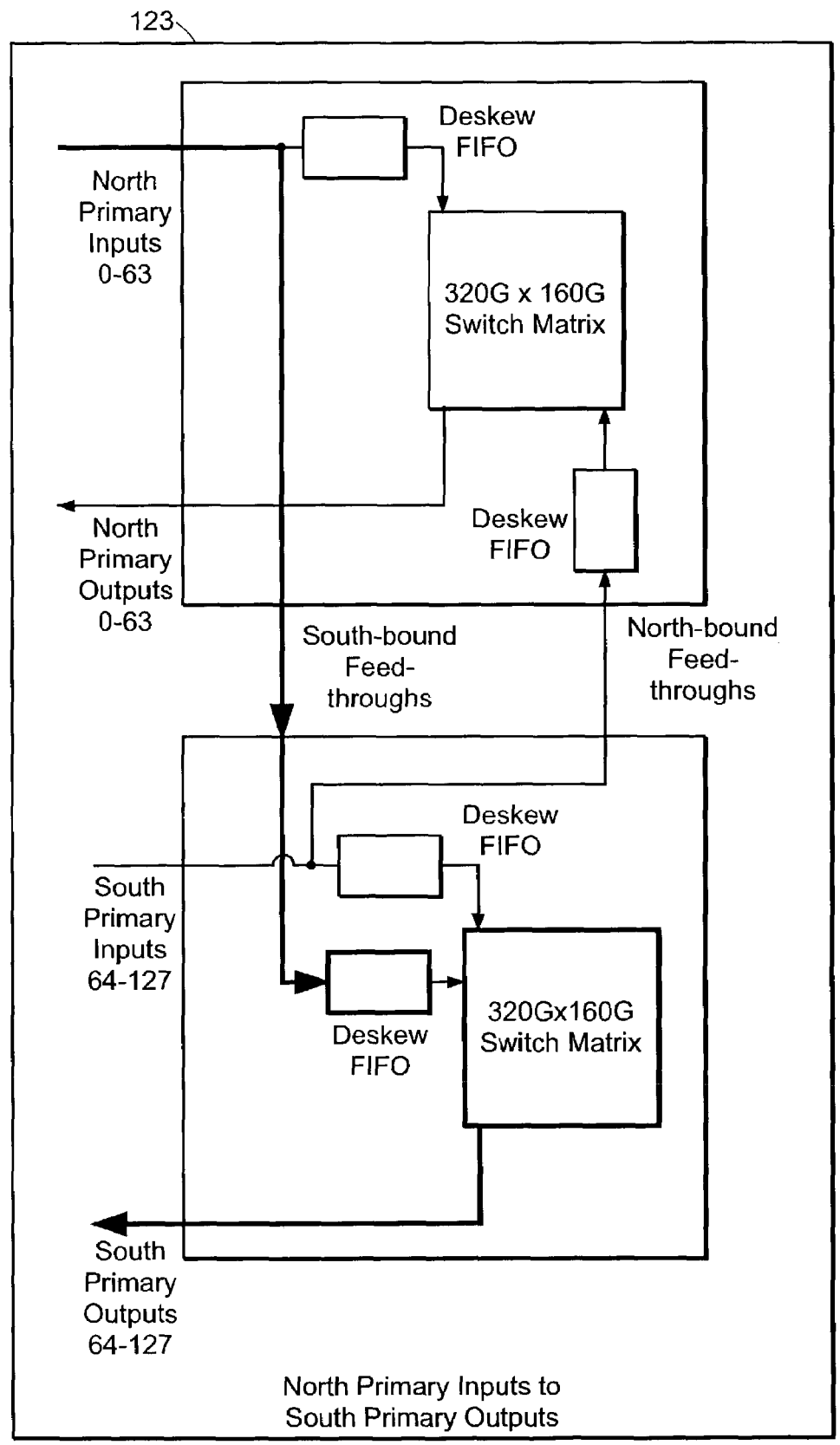

For instance, to connect a north primary input to a south primary output as in 123 of FIG. 12A-2, a connection map in the lower cross-connect IC 100S for the output port is programmed to accept input from the south-bound input port which receives data from the north primary port via a south-bound pass-through port. Those skilled in the art would readily see how to set up a connection in general for the network in FIG. 5.

Figures 1, 12B:
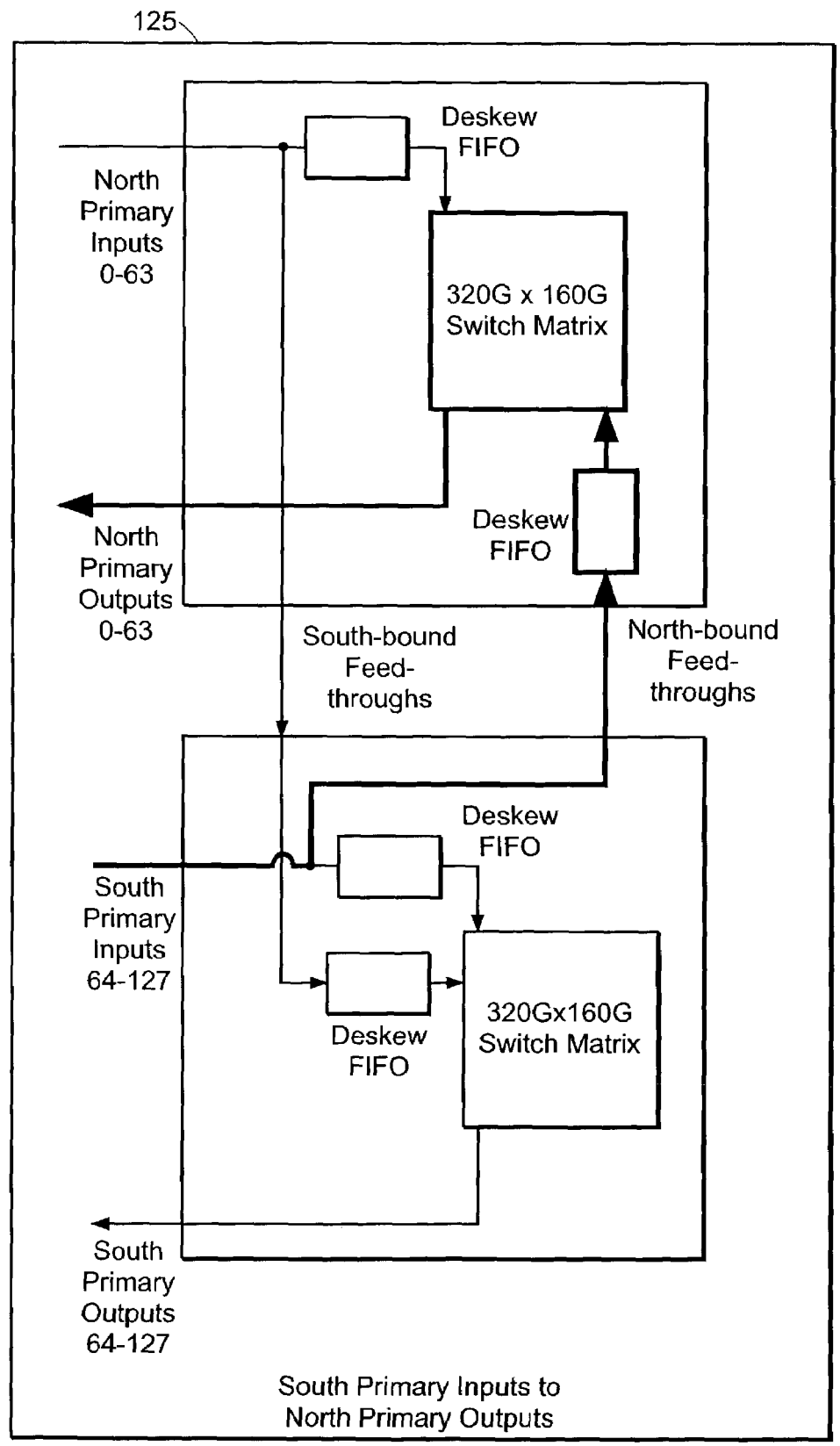
Figures 2, 12B:
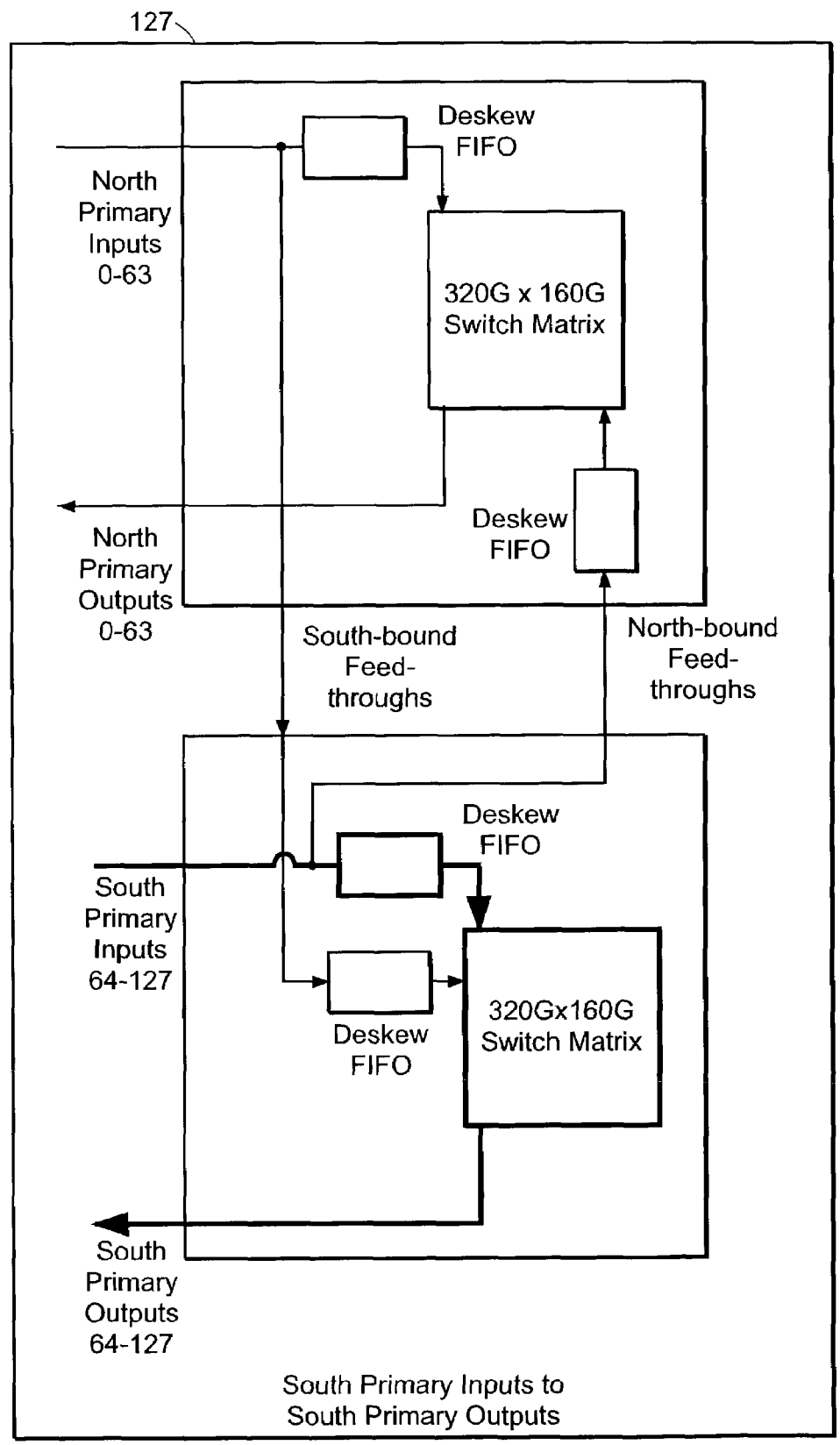

Reference numbers 121 of FIG. 12A-1, 125 of FIG. 12B-1 and 127 of FIG. 12B-2 similarly illustrate, respectively, north primary input to north primary output, south primary input to north primary output, and south primary input to south primary output configurations.

While this invention has been particularly shown and described with references to preferred embodiments thereof, it will be understood by those skilled in the art that various changes in form and details may be made therein without departing from the scope of the invention encompassed by the appended claims.

What is claimed is:

1. A switching system, comprising:
   a number N of system inputs, where N is an integer;
   a number N of system outputs;
   a number M of cross-connect integrated circuits (ICs), where M is an integer greater than one;
   each cross-connect IC having (i) one or more link input ports, (ii) one or more link output ports, (iii) N/M direct inputs directly receiving input data streams from a respective N/M of said N system inputs and (iv) N/M direct outputs outputting to a respective N/M of said N system outputs;
   each cross-connect IC further having a switch matrix having N inputs and N/M outputs; and
   each cross-connect IC providing fanout of the N/M direct inputs to the one or more link output ports to communicate the N/M direct inputs to each other cross-connect IC.

2. The switching system of claim 1, each cross-connect IC further comprising:
   deskewers which deskew, post-fanout, the input data streams which are input to the cross-connect's switch matrix, wherein all such input data streams are synchronized prior to switching.

3. The switching system of claim 2, wherein the deskewers comprise buffers.

4. The switching system of claim 3, wherein the buffers comprise FIFO buffers.

5. The switching system of claim 1, wherein the input data streams are merged into a merged stream prior to being forwarded to the other cross-connect ICs.

6. The switching system of claim 5, wherein the merged stream has a higher bandwidth than the input data streams contained therein.

7. The switching system of claim 5, wherein the input data streams are bit-interleaved.

8. The switching system of claim 5, wherein a unique identifier is embedded in a used portion of at least one of the input data streams.

9. The switching system of claim 5, wherein each cross-connect IC receiving a merged stream demultiplexes and reconstructs the input data streams based on identifiers embedded in at least one of the input data streams.

10. The switching system of claim 1, wherein said input data streams comprise SONET/SDH data streams.

11. The switching system of claim 1, wherein different inputs/outputs have different bandwidth capabilities.

12. A switching method, comprising:
    interconnecting plural cross-connect ICs, each IC having a direct input directly receiving a respective fraction of a number of system inputs and directly outputting to a respective fraction of a number of system outputs, each cross-connect IC having a switch matrix having a number of inputs that matches the number of system inputs and a number of outputs that matches the respective fraction of the number of system outputs coupled to the IC; and
    fanning out each cross-connect IC direct input to a link to each other cross-connect IC.

13. The switching method of claim 12, further comprising, in each cross-connect IC:
    deskewing, post-fanout, data streams which are input to the cross-connect's switch matrix, wherein all such data streams are synchronized prior to switching.

14. The switching method of claim 13, deskewing being performed with buffers.

15. The switching method of claim 14, the buffers being FIFO buffers.

16. The switching method of claim 12, further comprising:
    merging plural input streams into a merged stream for forwarding to the other cross-connect ICs.

17. The switching method of claim 16, wherein the merged stream has a higher bandwidth than the individual streams contained therein.

18. The switching method of claim 16, wherein merging the plural input streams comprises bit-interleaving the input streams.

19. The switching method of claim 16, further comprising:
embedding a unique identifier in a portion of at least one of the input streams.

20. The switching method of claim 16, further comprising:
receiving and demultiplexing a merged stream; and
reconstructing the input streams based on identifiers embedded in at least one of the input streams.

21. The switching method of claim 12, wherein input data streams to each IC comprise SONET/SDH data streams.

22. The switching method of claim 12, wherein different inputs/outputs have different bandwidth capabilities.

23. A cross-connect integrated circuit (IC), comprising:
input ports for directly receiving a first respective fraction of a number of system inputs to a switching system and output ports for outputting to a respective fraction of a number of system outputs of the switching system;
a link receiver for receiving, over a first link from a second cross-connect IC, a second respective fraction of said number of system inputs which are directly received by said second cross-connect IC;
a switch matrix having a number of inputs that matches the number of system inputs and a number of outputs that matches the respective fraction of said number of system outputs to which the output ports of the IC output; and
a fanout circuit which provides fanout of the directly received inputs, for transmission over a second link to the second cross-connect IC.

24. The integrated circuit of claim 23, further comprising:
deskewers which deskew, post-fanout, data streams which are input to the cross-connect's switch matrix, wherein all such data streams are synchronized prior to switching.

25. The integrated circuit of claim 24, wherein the deskewers comprise buffers.

26. The integrated circuit of claim 25, wherein the buffers comprise FIFO buffers.

27. The integrated circuit of claim 23, wherein the fanout circuit comprises multiplexing circuitry for merging plural input streams into a merged stream prior to transmission over the second link.

28. The integrated circuit of claim 27, wherein the merged stream has a higher bandwidth than the individual streams contained therein.

29. The integrated circuit of claim 27, wherein the multiplexing circuitry bit-interleaves the plural input streams.

30. The integrated circuit of claim 27, wherein the fanout circuit embeds a unique identifier in a portion of at least one of the plural input streams.

31. The integrated circuit of claim 27, further comprising:
demultiplexing circuitry which demultiplexes a merged stream received from the second cross-connect IC and reconstructs input streams based on identifiers embedded in at least one of the input streams by the second cross-connect IC.

32. The integrated circuit of claim 23, wherein input data streams comprise SONET/SDH data streams.

33. The integrated circuit of claim 23, wherein different inputs/outputs have different bandwidth capabilities.

34. The switching system of claim 1, wherein M is a factor of N.

* * * * *